United States Patent [19]

Randahl

[11] Patent Number: 5,734,712
[45] Date of Patent: Mar. 31, 1998

[54] METHOD FOR OFF-HOOK DETECTION DURING RINGING AND THE USE OF A SUBSCRIBER LINE INTERFACE CIRCUIT FOR OFF-HOOK DETECTION DURING RINGING

[75] Inventor: Torbjörn Ivar Randahl, Nacka, Sweden

[73] Assignee: Telefonaktiebolaget LM Ericsson, Stockholm, Sweden

[21] Appl. No.: 375,684

[22] Filed: Jan. 20, 1995

[30] Foreign Application Priority Data

Jan. 21, 1994 [SE] Sweden ................. 9400186

[51] Int. Cl.$^6$ ........................................... H04M 3/00
[52] U.S. Cl. .................. 379/382; 379/377; 379/399; 379/373
[58] Field of Search ................. 379/382, 377, 379/373, 399, 381, 387, 418, 378, 64, 65, 66

[56] References Cited

U.S. PATENT DOCUMENTS

| | | | |
|---|---|---|---|
| 3,591,728 | 7/1971 | Birck | 379/65 |
| 4,132,864 | 1/1979 | Feng | 379/377 |
| 4,234,762 | 11/1980 | Bosik | 379/65 |
| 4,396,805 | 8/1983 | Wagner | 379/252 |
| 4,406,929 | 9/1983 | Pace et al. | 379/402 |
| 4,455,456 | 6/1984 | Cochran | 379/351 |
| 4,524,246 | 6/1985 | Meza | 379/377 |
| 4,540,853 | 9/1985 | Albouy | 379/378 |
| 4,617,426 | 10/1986 | Johansson et al. | 379/324 |
| 4,631,359 | 12/1986 | Johansson et al. | 379/324 |
| 4,631,360 | 12/1986 | Johansson et al. | 379/324 |
| 4,731,828 | 3/1988 | Basehore | 379/382 |
| 4,731,829 | 3/1988 | Bonnet et al. | 379/382 |
| 4,742,536 | 5/1988 | Dewenter et al. | 378/382 X |
| 4,797,578 | 1/1989 | Eriksson | 327/525 |
| 4,797,917 | 1/1989 | Pasetti et al. | 379/382 X |
| 4,809,258 | 2/1989 | Lechner et al. | 379/382 X |
| 4,847,896 | 7/1989 | Siligoni et al. | 379/253 |
| 4,853,959 | 8/1989 | Johansson et al. | 379/413 |
| 4,961,222 | 10/1990 | Johansson et al. | 379/413 |
| 5,172,407 | 12/1992 | Alenius | 379/124 |
| 5,335,272 | 8/1994 | Löfmark et al. | 379/413 |
| 5,402,482 | 3/1995 | Minohara et al. | 379/377 |
| 5,406,623 | 4/1995 | Rovik | 379/418 |
| 5,425,089 | 6/1995 | Chan et al. | 379/183 |
| 5,426,695 | 6/1995 | Misu | 379/382 X |

FOREIGN PATENT DOCUMENTS

| | | |
|---|---|---|
| 089 687 | 9/1983 | European Pat. Off. |
| 20 14950 | 10/1971 | Germany. |
| A5897949 | 6/1983 | Japan. |
| A5897950 | 6/1983 | Japan. |
| WO93/01676 | 1/1993 | WIPO. |

*Primary Examiner*—Krista Zele
*Assistant Examiner*—Devendra T. Kumar
*Attorney, Agent, or Firm*—Burns, Doane, Swecker & Mathis, L.L.P.

[57] ABSTRACT

A method and an apparatus for off-hook detection in a subscriber line interface circuit responds to a ringing signal which preferably lacks a DC component. A signal is generated that is a function of the line current through the subscriber line, and the time at which the signal exceeds a predetermined current value is measured. The measured time is compared with a predetermined time value, and an off-hook indication is produced in a processor depending on the comparison.

9 Claims, 4 Drawing Sheets

METHOD FOR OFF-HOOK DETECTION DURING RINGING AND THE USE OF A SUBSCRIBER LINE INTERFACE CIRCUIT FOR OFF-HOOK DETECTION DURING RINGING

BACKGROUND

The present invention relates to a method for off-hook detection during ringing in a subscriber line interface circuit as well as the use of a subscriber line interface circuit for the above mentioned detection.

Installation costs for new copper lines are increasing and make up a large part of the total installation cost. The society of tomorrow will have a need for higher capacity than what the copper/coaxial cable systems of today can handle. New teleservices will be introduced, which will demand higher information transfer together with the expansion of the cable television networks. Through coordination of the teleservices with TV on the same optical fiber the installation costs could be lowered considerably. The last bit of cable to the subscriber is however still paired cable of copper.

With short lines there does not exist a need for as strong ringing signals out from the line as with long lines. The lower voltages for ringing on the line interface board enable ringing with an integrated circuit, the so called subscriber line interface circuit (SLIC), which means that no ring-trip relay is required. A problem which however needs to be solved is to quickly trip the ringing signal when the subscriber lifts the phone in order to prevent the strong currents which otherwise threaten to destroy the SLIC.

At conventional ring trip detection, i.e. the detection of when the subscriber lifts the phone during the ringing process, the DC shift is detected, which occurs when the phone is lifted (off-hook) and thereby opens a DC path in the loop. It should however be pointed out that the bell is AC coupled.

There exists within the art several different types of devices and methods for the detection of this DC shift. See for instance Patent Abstracts of Japan, Vol 7, no. 200, E-196, abstract of JP-A-58-97950 (FUJITSU K. K), Jun. 10th 1983 och Patent Abstracts of Japan, Vol 7, no. 200, E-196, abstract of JP-A-58-97949 (FUJITSU K. K), June 10th 1983. U.S. Pat. No. 4,132,864, DE-B2-2014950, U.S. Pat. No. 4, 455, 456. All of these documents thus describe different ways of detecting the occurrence of a DC level in the ringing signal.

The voltage range in a SLIC is however limited, which is why it would be desirable to remove the DC level which normally occurs when the hook is off during ringing. A SLIC is described in Swedish Patent Application No. 9400185-6, which corresponds to U.S. Pat. No. 5,553,132 issued Sep. 3, 1996 entitled "Method and an Arrangement for Generating a Ringing Signal" that is incorporated here by reference, which comprises a ringing signal generator and a loop which removes the DC level from the ringing signal when the hook is off during ringing.

Yet another device which detects the off-hook condition during ringing is described in WO-A1-9301676 (FUJITSU LIMITED et. al.), 2 Jan. 1993. This device detects when a ringing current through a resistor, which is connected in series with a ring signal generator, exceeds a threshold, which detection causes a detection signal for off-hook during ringing to be emitted by the device. This ringing signal does also include a DC component during off-hook. In this device the time the threshold is exceeded does not seem to be used in the indication of off-hook during ringing.

According to the specification BELLCORE TR-TSY-000057 the ringing signal shall be disconnected from the telephone within 200 ms after a resistance of 300$\Omega$ is coupled to the line, which shall have a loop resistance $\leq$ (Rdc-400) $\Omega$, where Rdc = the line resistance +430 $\Omega$, i.e. the resistance in the paired cable to the subscriber +400 $\Omega$ which shall represent an ordinary telephone +30$\Omega$ which represents the resistance from the connection box.

The ring trip detector shall on the other hand not react upon coupling of 10 k$\Omega$+8 $\mu$F or coupling of 200 $\Omega$ during 12 ms.

SUMMARY

The object of the present invention is to provide off-hook indication during the occurrence of a ringing signal, which preferably lacks a DC component, with certainty and in a fast and simple way that can be accomplished with a SLIC that is only slightly modified.

This object is achieved through a method with the steps of generating a signal which is a function of the line current through the subscriber line, measuring the time the signal exceeds a first reference value, which represents a predetermined current value, comparing the measured time with a predetermined time value and indicating off-hook in dependence of the comparison.

Yet another object of the present invention is to provide a method for the provision of off-hook indication upon the occurrence of a ringing signal without DC component which is even faster than the first mentioned method.

This object is achieved through the signal being a function of the absolute value of the line current.

Yet another object of the present invention is to avoid unnecessary oscillation in the off-hook indication.

This object is accomplished through the measuring step including measuring of the time from when the signal rises above the first reference value to when it falls below a second reference value, which is slightly offset from the first reference value.

Yet another object of the present invention is to provide a new use of a SLIC.

This object is achieved through the use of a SLIC to detect the off-hook condition upon the occurrence of a ringing signal, whereby a detector which is included in the SLIC is arranged to generate a signal which is a function of the line current through the subscriber line and to measure the time the signal exceeds a first reference value ($V_{th}$), which represents a predetermined current value, and emit a signal representing the measured time to a processor for comparison with a predetermined time value for the indication of off-hook during ringing.

Other objects and advantages of the present invention will be made clear through the following description and claims.

BRIEF DESCRIPTION OF THE DRAWINGS

The present invention is described in more detail below where reference is being made to the appended drawings, where.

DETAILED DESCRIPTION

According to the invention the current difference is detected, which appears because of the impedance difference between the impedance of the bell(s) and the telephone. 1 telephone, 1 REN: 7 kΩ relative to 7 kΩ//400Ω→7 k relative to 378, i.e. an impedance difference of 18.5 times. 5 telephones, 5REN: 1.4 kΩ relative to 1.4 kΩ//400Ω→1.4 k relative to 311, i.e. an impedance difference of 4.5 times.

Figure 1:
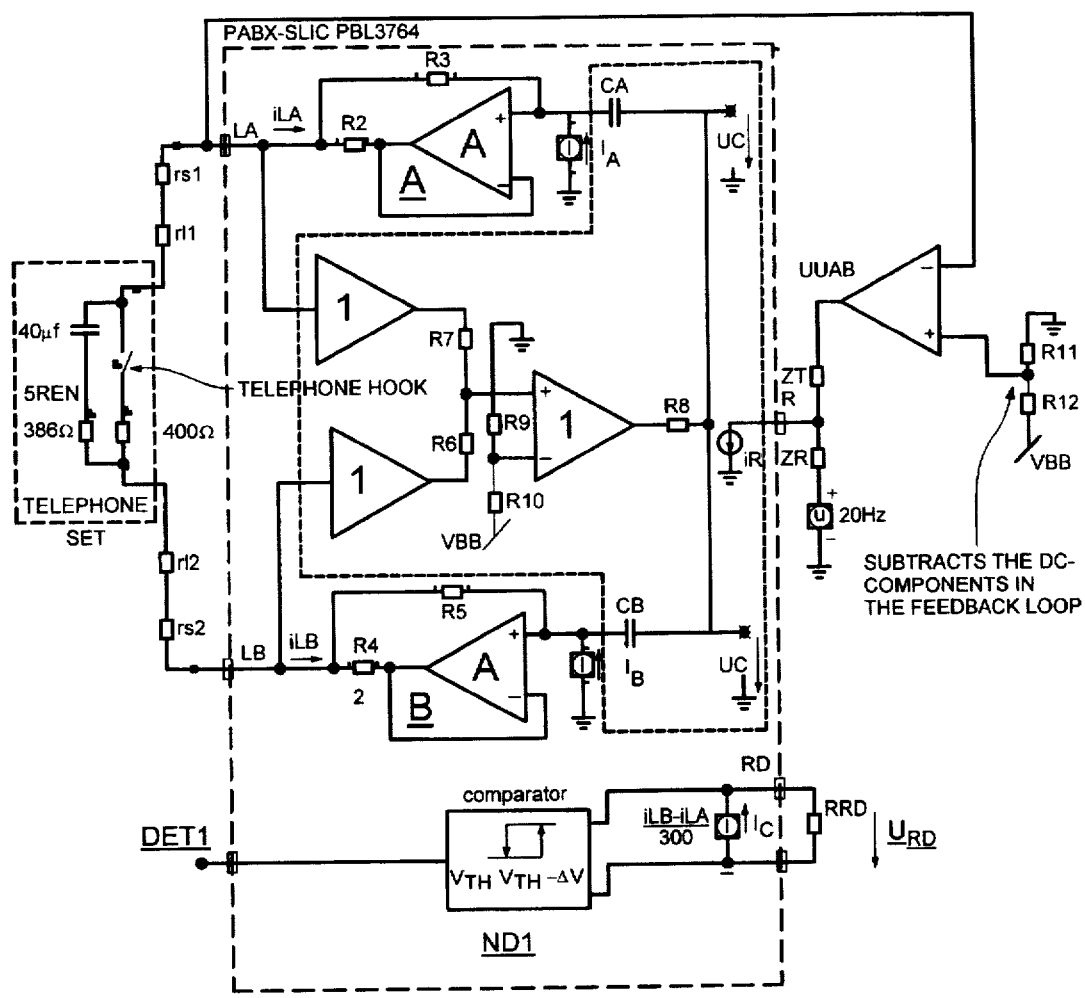
FIG. 1 shows a SLIC which performs the method according to a first embodiment of the present invention.

FIG. 1 shows a subscriber line interface circuit PABX-SLIC PBL3764 which according to a first embodiment of the method according to the invention detects off-hook during ringing. In the figure a telephone 5REN is shown as a resistance of 400Ω in series with a switch (TELEPHONE HOOK), which are connected in parallel with a resistance of 386Ω in series with a capacitor of 40 µF. A first end of the telephone 5REN is connected to one input LA on the SLIC via one of the subscriber line wires, which wire includes the line resistance rll and the protection resistance rs1. The input LA is connected to the output of a current amplifier A via a measuring resistance R2, where the inverting input of the amplifier A is connected to the output and the non-inverting input is connected to the subscriber line via a resistance R3. The non-inverting input of the current amplifier A is also connected to a potential uc via a capacitor CA. A current source IA which is dependent on the potential uc is also connected between the non-inverting input of the current amplifier A and ground. A second end of the telephone 5REN is in the same manner connected to an input LB on the SLIC via the other subscriber line wire, which includes the line resistance rl2 and the protection resistance rs2. The input LB is connected to the output of a current amplifier B via a measuring resistance R4, where the inverting input of the amplifier B is connected to the output and the non-inverting input is connected to the subscriber line via a resistance R5. The non-inverting input of the current amplifier B is also connected to a potential uc via a capacitor CB. A current source IB which is dependent on the potential uc is also connected between the non-inverting input of the current amplifier B and ground. The inputs LA and LB of the SLIC are also, each via an amplifier with the amplification of 1 in series with a resistance R7 and R8, respectively, connected to the non-inverting input of an operational amplifier with amplification 1, whose inverting input is connected to the interconnection point between two equally large resistances R9, R10 which are connected in series, which resistances are connected between ground and the supply voltage VBB of the SLIC. The output of the latter operational amplifier is via a resistance R8 connected to the potential uc.

The above described components are often used in SLICs and their functions are well known and will not be further described in this description.

In FIG. 1 one of the subscriber line wires LA is also connected to the first input of an operational amplifier UUAB, whose other input is connected to the interconnection point between two equally large resistances R11, R12 which are connected in series, which resistances are connected between ground and the supply voltage VBB of the SLIC.

The output of the operational amplifier UUAB is connected to the current input R of the SLIC via a resistance ZT. A 20 Hz signal generator U is also connected to this current input R via a resistance ZR. The current through the current input R supplies current to the current amplifiers A and B for modulation of these to generate the ringing signal. This device provides ringing in the SLIC without any DC component and is described, for example in Swedish patent application 9400185-6.

In FIG. 1 is finally shown a detector ND1, which originally was arranged for off-hook detection although not during ringing. The detector ND1 includes a comparator. A dependent current source ID is connected across the input of the comparator, which also serves as an output RD of the SLIC. Across this output RD is a resistance RRD connected. The output DET1 of the comparator is connected to a processor (not shown) which is external to the SLIC. This processor is also arranged to be able to trip the ringing current from the ring signal generator U. The dependent current source ID in the detector ND1 is in a known way connected to the measuring resistances R2 and R4 (not shown) in order to generate a current which is a linear function of the line current.

Figure 2:
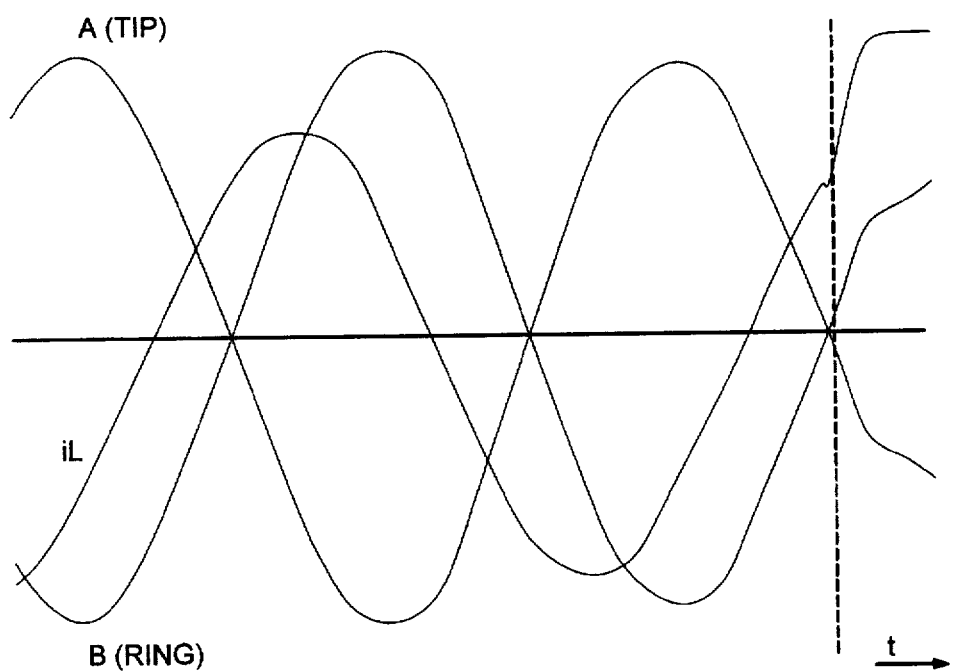
FIG. 2 shows a diagram of the line current as well as the voltage over the line wires during on-hook and off-hook.

FIG. 2 shows a simulation of the line current il during ringing, where il=iLB−iLA, and with a load of 5REN (bell =700Ω+2 µF+22 H) and a line resistance of 0Ω and the frequency 20 Hz as a function of time at on-hook and off-hook states. In the figure is also shown a simulation of the voltage at the A-wire (TIP) which represents LA as well as the voltage at the B-wire B (RING) which represents LB. In the figure one can see that the voltage up to the time indicated by the dashed vertical line is phase displaced from the current approximately −60°, at which point in time the off-hook state occurs and the current rapidly rises and current and voltage are substantially in phase. Although it is not clearly shown here the line current il does not include any DC-component in the off-hook state as it is the momentary value of the line current il.

Figure 3:
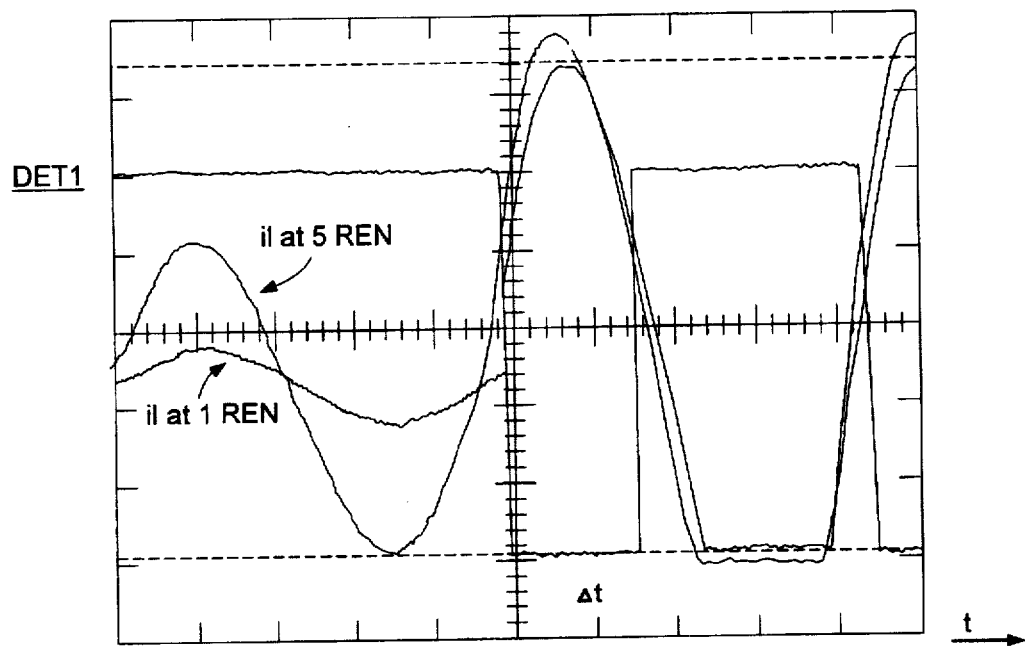
FIG. 3 shows graphs of the line current during off-hook and on-hook as well as the output of a detector which is included in the SLIC.

FIG. 3 shows measured results from a device according to FIG. 1 for off-hook detection during ringing. In the figure the line currents il (1REN) and il (5REN) are shown together with the output signal DET1 from the detector ND1. Referring to FIG. 1 and 3 the method according to the first embodiment of the invention is carried out in the following manner:

The current that leaves the current amplifier A (−iLA) and the current that goes into the current amplifier B (=iLB) are measured in the measuring resistances R2 and R4 and are summed (iLB−iLA) in order to obtain the transversal line current in the dependent current source ID of the detector ND1. A voltage function $U_{RD}$ of the transversal line current (iLB−iLA)/300, which is determined through the resistance RRD and the dependent current source ID, is then coupled into the detector ND1. The detector levels $V_{th}$ and $V_{th}$-ΔV are through choice of the resistance RD set for the detection of the time Δt from when the line current il rises above a first predetermined current value to when it falls below a second predetermined reference value. The second pre-determined reference value is slightly offset from the first reference value, preferably by 1 −2% of the first reference value, and both are set in an interval between the maximum on-hook line current and the maximum off-hook line current. The output DET1 of the detector ND1 has a high signal level as long as the line current il is lower than the predetermined current levels. When however the line current il rises above the first predetermined current level the output DET1 goes low and stays low until the line current il falls below the second predetermined current level. The second level is offset from the first in order to achieve hysteresis. The output DET1 of the detector ND1 is then processed in the processor in order to indicate the off-hook state in such a way that the time Δt that the output DT1 stays low is compared with a predetermined time lengths, preferably a sixth of the period of the ringing signal, and off-hook is indicated if this predetermined time length is exceeded, after which the processor trips the ringing.

This method shows the following advantages:
1) No extra detector for detecting off-hook during ringing is needed, which means that less chip area is needed.
2) No external ring trip network is needed, which means fewer external components.

The difference in line current between on-hook and off-hook ringing is not quite proportional to the line load, due to the fact that the amplification 4→2 is not constant.

A current difference of about 2.7 times is obtained in the worst case, which difference should be possible to detect with a current sensing loop detector.

Figure 4:
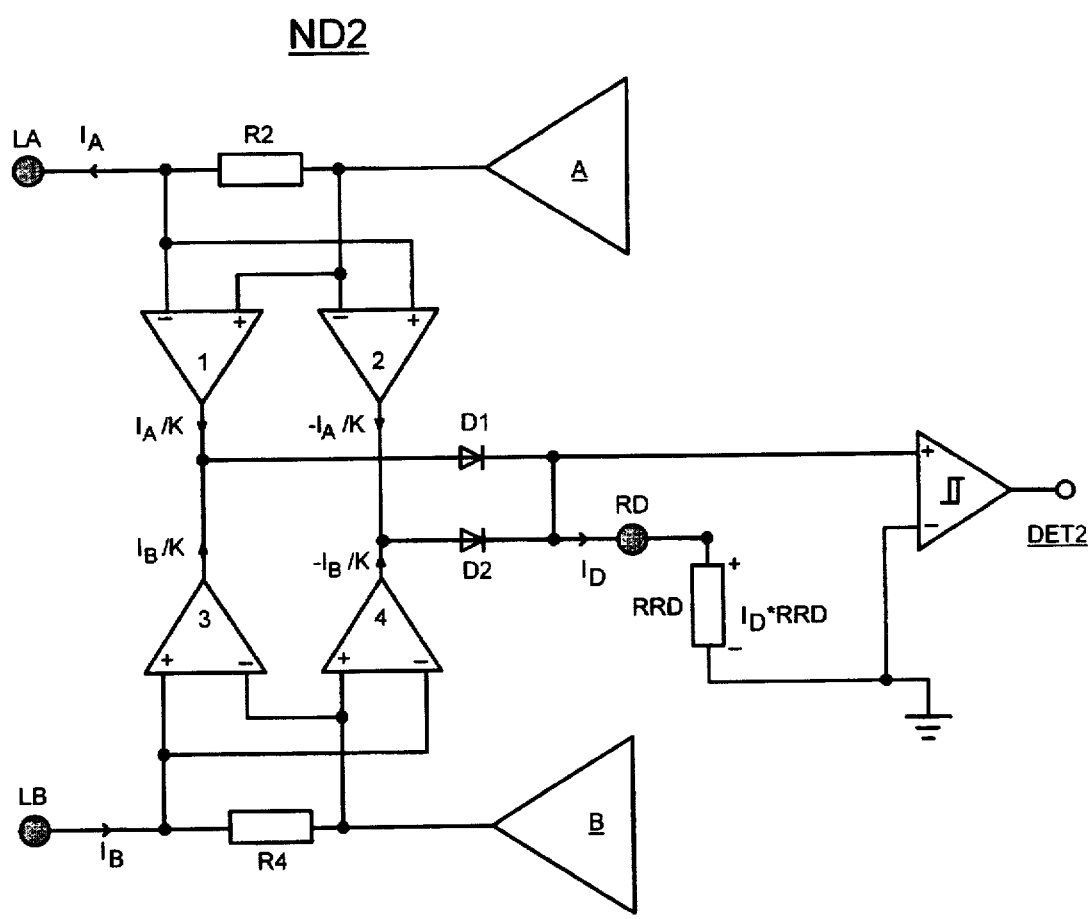
FIG. 4 shows a circuit which implements part of a second method according to the present invention and FIG. 5 shows graphs of the line current during on-hook and off-hook as well as output signals from the detector in a SLIC comprising the circuit in FIG. 4.

In FIG. 4 is shown a circuit which implements a dependent current source in a SLIC which performs a method according to a second embodiment of the present invention. This circuit already exists in the SLIC named PABX-SLIC PBL3799 and comprises four voltage/current amplifiers 1, 2, 3 and 4, whereby the voltage/current amplifiers 1, 2 are connected across the resistance R2, which in FIG. 1 is connected to the input LA and the amplifiers 1, 2 each supply a current $I_A/K$ and $-I_A/K$, which both represent the current $I_A$ with K being a constant. The voltage/current amplifiers 3, 4 are in the same way connected across the resistance R4, which in FIG. 1 is connected to the input LB, and which amplifiers 3, 4 each supply a current $I_B/K$ and $-I_B/K$, which represent the current $I_B$ and with K being a constant. The outputs of the voltage/current amplifiers 1, 3 are interconnected and connected to a first input terminal of a comparator via a first diode D1. The outputs of the voltage/current amplifiers 2, 4 are in the same manner interconnected and connected to the same input terminal of the comparator via a second diode D2. The second input terminal of the comparator is grounded and the resistance RRD is connected between these two terminals. In this figure the two current amplifiers A and B from FIG. 1 are also shown. The currents $I_A$ and $I_B$ represent −iLA and iLB from FIG. 1. The voltage/current amplifiers 1, 2, 3 and 4 together with the diodes D1 and D2 in this circuit make up a dependent current source which emits a current $I_D$ that is a function of the absolute value of the line current. This current $I_D$ runs through the resistance RRD and the voltage thereacross $I_D$*RRD is used as a signal representing the absolute value of the line current and is supplied to the comparator. On the output of the comparator a output signal DET2 is then obtained. If the amplifiers 2 and 4 as well as the diodes D1 and D2 are removed the dependent current source according to FIG. 1 is obtained.

Figure 5:
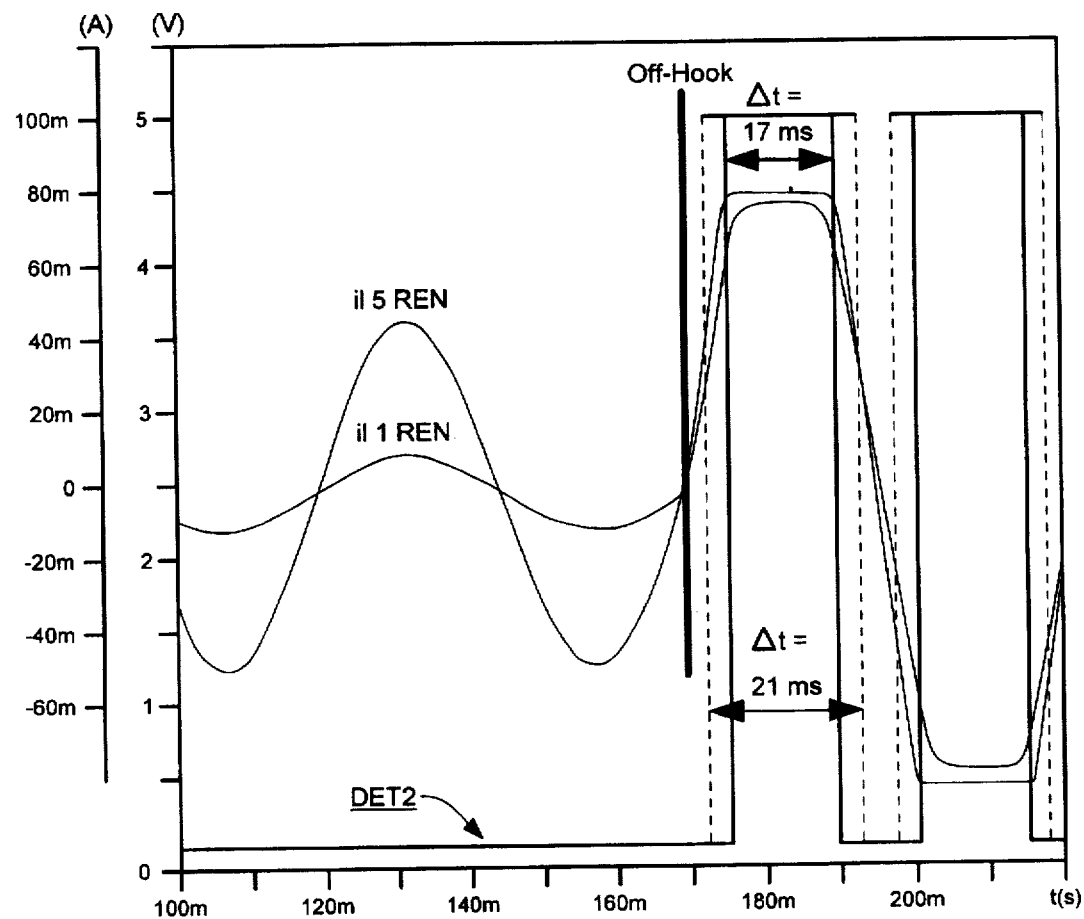

In FIG. 5 is finally shown simulations of the line current il with a bell of 5REN and line resistance of 0Ω and a bell of 1REN and line resistance of 200Ω, both with a frequency of 20 Hz, and the output signal from the detector ND2 according to FIG. 4 for these signals at on-hook and off-hook states. The telephone hook is on up to the time indicated by the solid vertical line designated Off-Hook, at which point in time the off-hook state occurs and the line current il increases. The output DET2 of the detector ND2 has a low level up to the above mentioned point in time but when the absolute value of respective line current rises above the first predetermined current value the output DET2 of the detector goes high and stays high until the line current il falls below the second predetermined current level. The time Δt that the output DET1 stays low is then transmitted to the processor in the form of a pulse. In the figure two pulses Δt are shown in order to illustrate that the detector ND2 reacts upon both the positive and-negative half periods of the line current, but in reality the ring signal generator is switched off after the first pulse. In the case of 1REN a pulse width Δt of 17 is was obtained and in the case of 5REN a pulse width Δt of 21 ms. The predetermined time value they are compared with is preferably a sixth of the ringing period, i.e. about 8.3 ms. When this time value is exceeded the processor indicates off-hook and thereafter trips the ringing signal.

The advantage of this second method is that off-hook detection during ringing is accomplished during both the half periods of the line current il, which makes this method faster than the first method.

A number of simulations (not shown) have also been made for this second embodiment of the method at different ringing loads, line resistances as well as telephone resistances than what is mentioned in TR-TSY-000057. They all show that acceptable pulse widths are obtained that exceed the mentioned predetermined time value.

If it is desired that the original use of the detector ND1 according to FIG. 1 for the off-hook detection without ringing should be retained whilst performing a method according to the invention one can easily devise a new detector for the off-hook detection during ringing. This can either be accomplished through the inclusion of a new detector with its own dependent current source, i.e. a doubling of detectors or through connection of an external detector to the output RD of the SLIC, in which latter case the existing dependent current source in the detector in the SLIC is used for both the detectors.

What is claimed is:
1. A method for off-hook detection at a subscriber line interface circuit upon the occurrence of a ringing signal which lacks a direct current component, comprising the steps of:
generating a signal which is a function of a line current through the subscriber line;
measuring a time the signal exceeds a first reference value that represents a predetermined current value, wherein the time is measured from when the signal rises above the first reference value to when it falls below a second reference value, which is slightly offset from the first reference value
comparing the measured time with a predetermined time value; and
indicating off-hook in dependence of the comparison.
2. The method according to claim 1, further comprising tripping the ringing signal upon off-hook indication.
3. The method according to claim 1, wherein the predetermined current value lies within an interval between the maximum on-hook line current and the maximum off-hook line current.
4. The method according to claim 1, wherein the predetermined time value is greater than or equal to a sixth of a period of the ringing signal.
5. The method according to claim 1, wherein the signal is a linear function of the line current.
6. The method according to claim 1, wherein the signal is a function of the absolute value of the line current.
7. A subscriber line interface circuit including a detector for off-hook detection during ringing, wherein the detector generates a signal that is a function of a line current through the subscriber line and measures a time that the signal exceeds a first reference value that represents a predetermined current value; the time measurement is made from when the signal rises above the first reference value to when it falls below a second reference value, which is slightly offset from the first reference value; and the detector provides a signal representing the measured time to a processor for comparison with a predetermined time value for indicating off-hook during ringing.

8. A subscriber line interface circuit according to claim 7, wherein the signal is a linear function of the line current.

9. A subscriber line interface circuit according to claim 7, wherein the signal is a function of the absolute value of the line current.

* * * * *